United States Patent Office 3,543,125
Patented Nov. 24, 1970

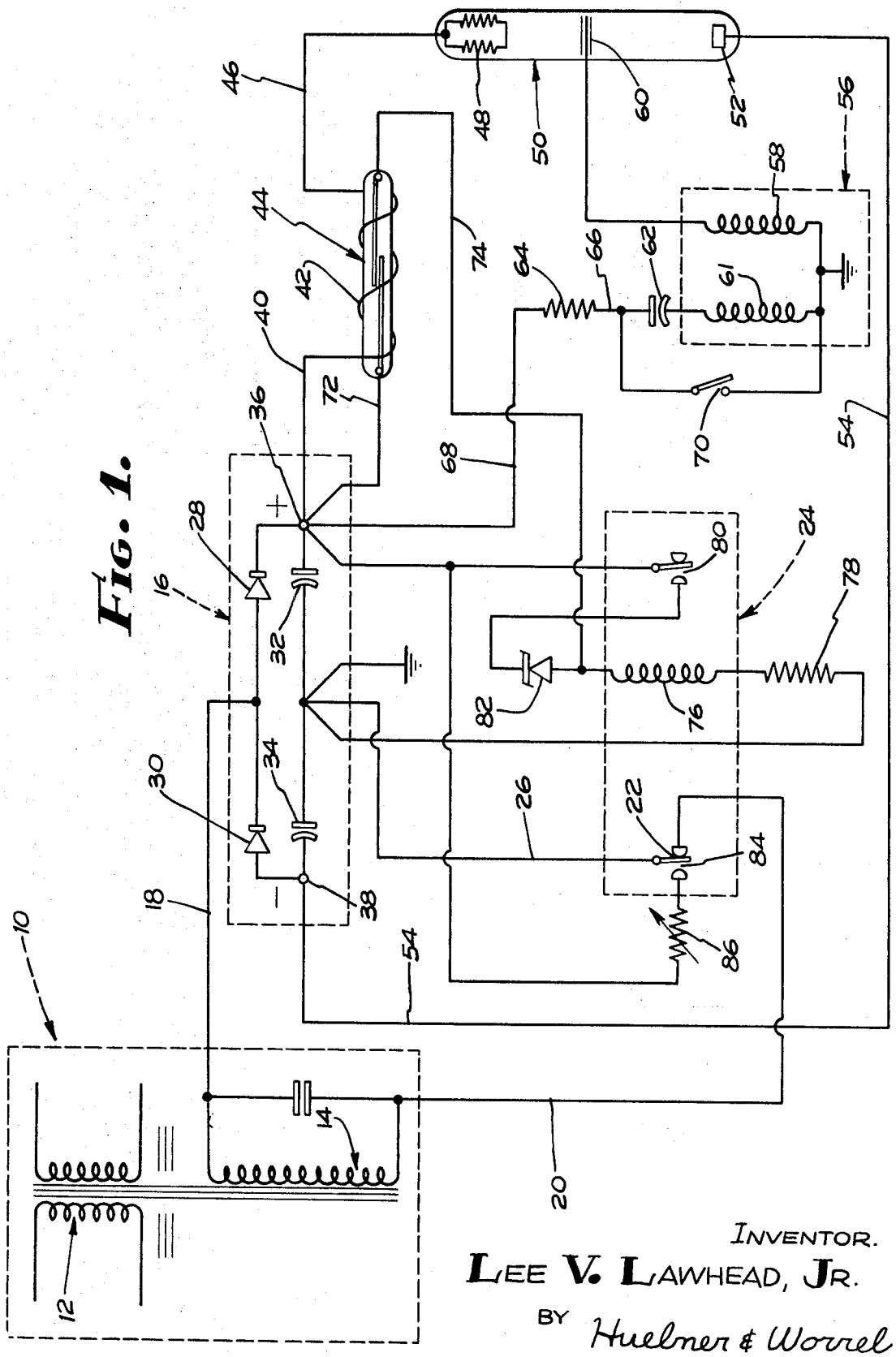

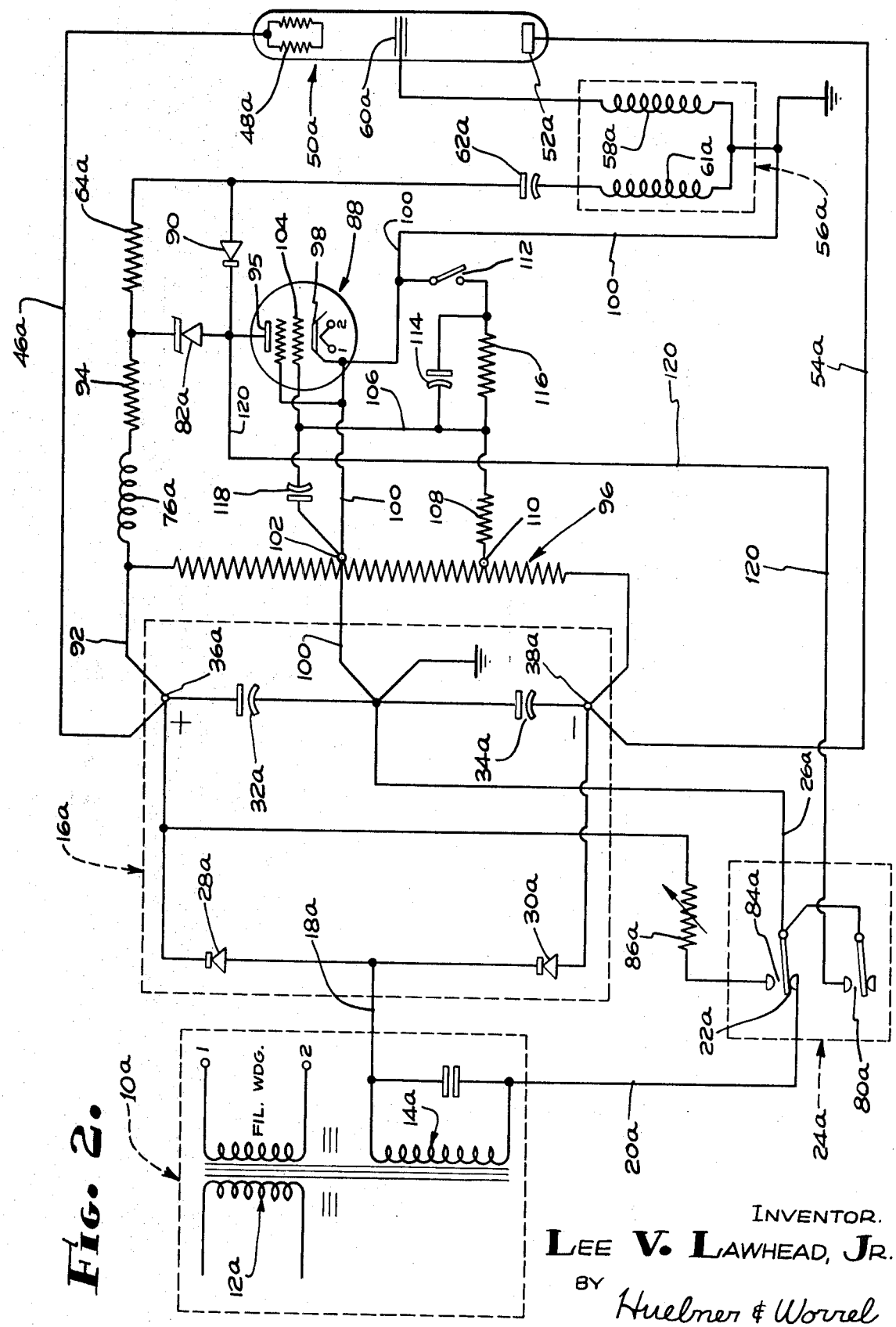

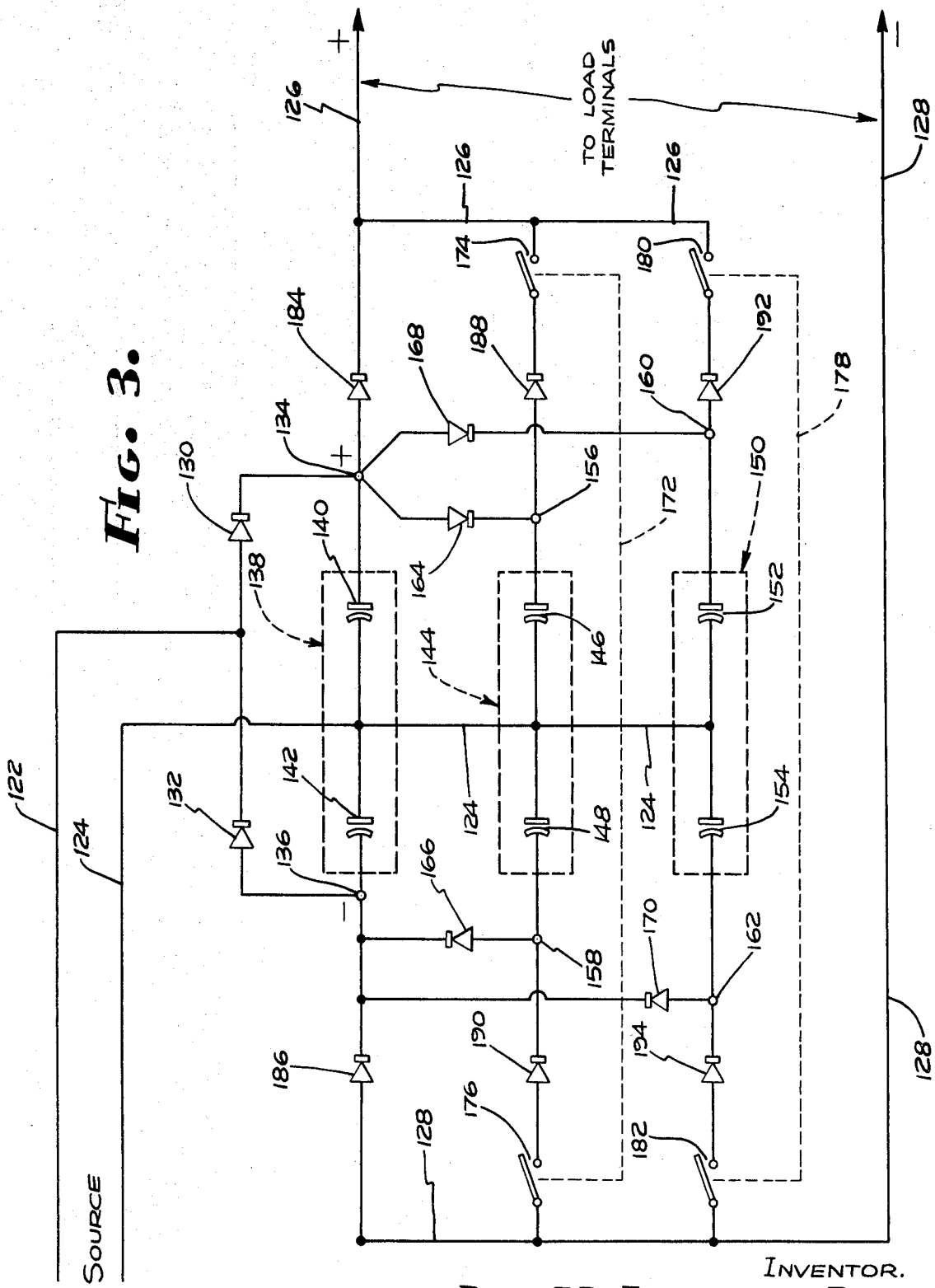

3,543,125
ELECTRICAL SYSTEM FOR CHARGING AND
DISCHARGING CAPACITORS
Lee V. Lawhead, Jr., Glendale, Calif., assignor to Mole-Richardson Co., Hollywood, Calif., a corporation of California
Filed Nov. 28, 1967, Ser. No. 686,252
Int. Cl. G05f 1/10; H02m 7/24; H05b 41/29
U.S. Cl. 320—1
17 Claims

ABSTRACT OF THE DISCLOSURE

An electrical system for charging capacitors and for rapidly discharging the capacitors into a load such as an electronic flash lamp type of gas discharge tube. The main capacitors serve as a power source and also as control elements for the actuation and timing of switching means for momentarily reducing or completely cutting off the capacitor charging current to allow substantially complete deionization of the load. Further switching means in combination with a number of blocking diodes permits adjustment of the amount of energy released from the capacitor bank by allowing capacitor sections to be switched in and out of the bank with simplified circuitry, minimal switch erosion and rapid capacitor recharging.

BACKGROUND OF THE INVENTION

The use of capacitors for the storage and controlled release of electrical energy presents difficult problems in switching to control initial capacitor discharge, timing and completion of the discharge, recharging of the capacitors and the switching of capacitor sections into and out of the load circuit. The switching problems are particularly difficult to cope with in electrical systems employing capacitor banks for supplying power to an electronic flash lamp type of gas discharge tube such as the type used to produce a high intensity flash of light of short duration for the purpose of exposing photographic film.

The operation of such a flashtube depends upon the discharge of a capacitor or bank of capacitors through the tube immediately following the application of a high voltage pulse to an ionizing electrode in the tube. During the discharge a flash of light is produced, the intensity of which depends primarily on the amount of electrical energy that is stored in the capacitors. The duration of the light flash depends upon the electrical system associated with the capacitors and the flashtube, and upon the flashtube itself.

A problem frequently encountered in such electrical systems supplying power to a flashtube, and particularly in such systems which have large energy storage and fast recharge capabilities, is that the flashtube never becomes completely deionized during its discharge, even though the primary portion of the discharge, for photometric purposes, is complete. The flashtube continues to pass current which is now conducted directly from the rectified AC source which provides the charging current to the capacitors. If this condition is allowed to continue, even for a short period, rapid deterioration and failure of the flashtube will occur.

While prior art systems of this type have included switching means for disconnecting the charging circuit from the main capacitor bank until the flashtube has become completely deionized, such prior art systems have required the use of control capacitor circuit means independent of the main capacitor bank for controlling the operation and timing of this switching. The use of such separate control capacitor circuitry undesirably complicates the overall circuit arrangement, and correspondingly reduces reliability and accuracy of control.

In photographic work it is frequently desirable that the amount of light produced by the flashtube be readily varied over a wide range. This can be accomplished by varying the amount of stored energy in the capacitor bank, and is most readily accomplished by switching capacitor sections in and out of the main capacitor bank. While varying the voltage across the capacitors would serve the same purpose since the stored energy is a function of both the capacitance and the voltage, this is not normally practical because the operational voltage of most flashtubes is limited over a relatively narrow range.

Although capacitor switching thus provides the most feasible means of varying the stored energy of the capacitor bank over a relatively wide range, it has the inherent problem of heavy current surges through the switch contacts when capacitor sections are switched into or out of parallel relationship for increasing or decreasing the stored energy. For example, if two capacitor sections are switched into parallel relationship, one of them being fully charged and the other being completely discharged, the resultant current inrush from the charged to the discharged section would be extremely large and would be likely to cause burning and welding of the paralleling switch contacts.

Attempts to solve this problem have heretofore generally involved the use of current limiting resistance in series with the applicable capacitor sections. However, the use of such resistances slows down capacitor bank recharging, and requires additional switching to remove these resistances from the circuit prior to discharge if the full stored energy of the paralleled banks is to be made available at the flashtube input terminals.

A still further problem in the art is the provision of power supply means for charging the capacitors which is capable of maintaining the full charge voltage level within narrow limits despite substantial variation in the AC input supply line voltage. Such power supply output voltage stability is essential in order that the amount of light per flash of the flashtube be relatively constant for any selected stored energy level. Small changes in voltage result in proportionately much larger changes in the amount of electrical energy stored in the capacitor bank, as may be seen from the expression for the stored energy of a capacitor, $J=\frac{1}{2}CE^2$ watt seconds (where C is the capacitance in farads and E is the voltage in volts to which the capacitor is charged).

SUMMARY OF THE INVENTION

In view of these and other problems in the art, it is an object of the present invention to provide an improved electrical system for charging capacitors and for rapidly discharging them into a load such as an electronic flash lamp type of gas discharge tube, wherein disabling circuit means temporarily cuts off or reduces the effectiveness of the capacitor charging circuit to allow time for the load to become deionized and non-conductive after the capacitor discharge, which disabling circuit means does not require the use of a supplementary or auxiliary control capacitor circuit such as was required to perform this function in prior art devices of this general type.

A more specific object of the invention is to provide an electrical system of the character described for charging and discharging capacitors, wherein the main capacitor or capacitors which serve as the energy discharge source of flashtube or other load operation also provide the electrical power and function as control elements for the actuation and timing of switching means in the system that momentarily disables the capacitor charging circuit, reducing or cutting off the capacitor charging current, to allow substantially complete deionization of the flashtube or other load.

Another object of the invention is to provide an electrical system of the character described wherein, by utilization of the power capacitor means to provide actuation and timing of switching means for completing deionization of the load, the circuit arrangement is simplified and control over such switching is more direct and positive than was possible with prior art circuit arrangements which required the use of auxiliary control elements such as a control capacitor.

A further object of the invention is to provide an electrical system of the character described wherein the switching to momentarily disconnect the power source from the capacitor-flashtube circuit or to momentarily cause the power source to be reduced to a level which will not support ionization of the flashtube, so that the flashtube is rendered non-conductive, is initiated by means of a reed switch having its current coil in the capacitor-flashtube circuit.

Another object of the invention is to provide an electrical system of the character described wherein such switching is initiated by means of a thyratron associated with the flashtube triggering circuit.

A further and more specific object of the invention is to provide a circuit arrangement of the character described wherein the switching means that momentarily reduces or completely cuts off the capacitor charging current is held in this momentarily actuated condition by energy in the form of a residual charge which remains on the main capacitors at the completion of the discharge, and which may amount to from about 5% to about 20% of the fully charged capacitor voltage just prior to the beginning of the discharge period. Holding time for the switching means is controlled by the rate of release of this residual charge, which in turn is controlled by an RC time delay circuit including at least one of the main capacitors as a circuit component.

A still further object of the invention is to provide, in an electrical system of the character described, a novel combination of switches and blocking diodes providing a simplified circuit arrangement permitting a plurality of capacitor sections to be switched in and out of a main capacitor bank, for adjusting the amount of energy released from the capacitor bank with minimal switch erosion, without requiring that the operator switch resistances out of the circuit prior to a flash discharge, and allowing rapid recharging of the capacitor bank.

An additional object of the invention is to provide an electrical system of the character described wherein the full charge voltage level of the capacitor bank is maintainable within narrow limits, as for example, within about plus or minus 1% to 2%, despite substantial variation of the AC input to the system, as for example about plus or minus 10%.

Other objects and advantages will become apparent from the following description and drawings, wheren:

BRIEF DESCRIPTION OF THE DRAWINGS

FIG. 1 is a circuit diagram illustrating one form of the invention wherein a reed switch is employed to initiate the switching action for momentarily reducing or completely cutting off the capacitor charging circuit to allow substantially complete deionization of the load.

FIG. 2 is a circuit diagram showing another form of the invention wherein a thyratron is employed to initiate such switching action.

FIG. 3 is a further circuit diagram illustrating circuit means for switching a plurality of capacitor sections into and out of a main capacitor bank for adjusting the amount of energy released from the capacitor bank to the load.

DETAILED DESCRIPTION

Referring to the drawings, and at first particularly to FIG. 1 thereof, power input is through a transformer 10 having a primary 12 and a high voltage secondary 14. The transformer 10 is a voltage regulating transformer wherein voltage regulation is accomplished by the incorporation of a ferro-resonant circuit. Preferably, this voltage regulation is sufficiently accurate to maintain the peak output voltage of the secondary 14, which determines the full charge voltage level of the capacitor bank, within narrow limits of plus or minus about 1% to 2%, despite an AC input line variation to the primary 12 of plus or minus about 10%. This will maintain the amount of light per flash of the flashtube relatively constant for any selected stored energy level, and this transformer regulation of the voltage results in considerable circuit simplification and corresponding economy in the manufacture of electronic flash power supplies. Additionally, such a voltage regulating transformer employing a ferro-resonant circuit has inherent current limiting characteristics which are of great advantage when the equipment is used on low capacity power systems.

The transformer secondary 14 is connected to a DC voltage doubling circuit generally designated 16, one side of secondary 14 being connected to the voltage doubling circuit 16 through a conductor 18, and the other side of the secondary being connected to the voltage doubling circuit through a conductor 20, normally closed contacts 22 of control relay 24 and a conductor 26. The juncture between conductor 26 and the voltage doubling circuit 16 is grounded.

The voltage doubling circuit 16 comprises a pair of rectifying diodes 28 and 30 on opposite sides of the juncture of conductor 18 with the doubling circuit, a pair of capacitors 32 and 34 on opposite sides of the juncture of conductor 26 with the doubling circuit, and respective positive and negative output terminals 36 and 38. Capacitors 32 and 34 are the main storage capacitors, representing the capacitor bank, for energization of the flashtube as will hereinafter be described in detail. As indicated in connection with FIG. 3 of the drawings, the capacitors 32 and 34 may be replaced by a plurality of capacitor sections making up the capacitor bank, and these sections may be interconnected by a series of switches and blocking diodes for selecting the amount of energy to be released from the capacitor bank.

The positive output terminal 36 of the voltage doubling circuit 16 is connected through a conductor 40 to one end of the current coil 42 of a reed switch 44, the other end of the current coil 42 being connected through a conductor 46 to the anode 48 of flashtube 50. The cathode 52 of flashtube 50 is connected to the negative terminal 38 of the voltage doubling circuit 16 through a conductor 54.

A high voltage pulse or triggering transformer 56 has its high voltage secondary 58 connected between the flashtube ionizing electrode 60 and ground. The primary 61 of transformer 56 is connected between ground and a triggering capacitor 62, the other side of which is connected through a resistor 64 to the positive output terminal 36 of the voltage doubling circuit through conductors 66 and 68. A triggering switch 70 is connected across the combination of transformer primary 61 and triggering capacitor 62, being connected between ground and conductor 66. The triggering switch 70 is normally open.

The reed switch 44 is normally open, one of its contacts being connected to the positive output terminal 36 of the voltage doubling circuit through a conductor 72, and the other reed switch contact being connected through a conductor 74 to one side of the coil 76 of control relay 24. The other side of coil 76 is connected through a resistor 78 to the juncture of conductor 26 with the voltage doubling circuit 16, i.e., to ground. The circuit just described, including conductor 72, the contacts of reed switch 44, conductor 74, coil 76 of relay 24, resistor 78 and its connection to ground, may be considered as the energizing circuit for the control relay 24.

The control relay 24 also has what may be considered to be a holding circuit, including normally open contacts 80 of the relay 24 and Zener diode 82, the relay contacts 80 and Zener diode 82 being connected in series between the positive output terminal 36 of the voltage doubling circuit and one side of the relay coil 76, the other side of which is connected through resistor 78 to ground.

A further circuit is associated with the relay 24, providing adjustment of the time duration of energization of relay 24 and consequent adjustment of the time interval during which the relay 24 cuts off the capacitor charging current to allow substantially complete deionization of the flashtube 50. This further circuit includes normally open relay contacts 84 of the relay 24 and variable resistor 86, these two components being connected in series between the positive output terminal 36 of the voltage doubling circuit and the conductor 26, which is grounded.

Having described the circuit components of FIG. 1 in some detail, the operation of the system illustrated in FIG. 1 will now be described. The primary 12 of transformer 10 is first energized from a suitable source of alternating current, which in turn causes the high voltage secondary 14 to supply power to the voltage doubling circuit 16, which converts such power to direct current by means of the diode rectifiers 28 and 30. Capacitors 32 and 34, which are arranged relative to each other in series, then become charged to a total value of approximately twice the peak value of the voltage across the transformer secondary 14. Due to the self-regulating action of the transformer 10, as previously described, this voltage to which the capacitors 32 and 34 are charged is held substantially constant.

During the process of charging the capacitors 32 and 34, the triggering capacitor 62 also becomes charged, but to a voltage equal to substantially one-half of the system voltage; i.e., that voltage appearing across the capacitor 32.

Discharge of the system, and consequent illumination of the flashtube 50, is initiated by closure of the triggering switch 70. This causes triggering capacitor 62 to be discharged through the primary 61 of the trigger transformer 56, which produces a high voltage pulse across the transformer secondary winding 58, this pulse being applied between ground and the ionizing electrode 60 of the flashtube 50. This causes the flashtube 50 to become ionized, and is followed immediately by discharge of the capacitors 32 and 34 through conductor 40, current coil 42 of reed switch 44, conductor 46 and thence through the flashtube 50 and the conductor 54.

The capacitor discharge current thus flowing through the current coil 42 of reed switch 44 causes the reed switch contacts to momentarily close, thereby impressing a voltage, derived from the voltage across the capacitor 32, on the coil 76 of relay 24. This causes relay 24 to pick up and seal in through its normally open contacts 80 which now become closed. At the same time, the normally closed relay contacts 22 are opened, and the normally open contacts 84 are closed. Opening of the relay contacts 22 disconnects the high voltage secondary 14 of transformer 10 from the voltage doubler 16; while closing of the relay contacts 84 connects the variable resistor 86 across the capacitor 32.

The momentary closure of the contacts of reed switch 44 and consequent energization of relay 24 commences during the flash discharge period, and the energization of relay 24 to keep the transformer 10 disconnected from the voltage doubling circuit 16 persists for a predetermined interval of time after completion of the discharge of the flashtube 50. This time interval is determined by the time that is required for the flashtube to become deionized. The reed switch 44 will become deenergized and thereby drop out when or shortly before the capacitor discharge current through the flashtube 50 (and consequently also through the current coil 42 of the reed switch) decays to zero. The control relay 24, however, remains energized by current supplied to the relay coil 76 from capacitor 32 through the sealed-in relay contacts 80, until the residual charge on the capacitor 32 is reduced to the drop-out point of relay 24. The time interval for this to occur is determined by the RC time constant of the circuit consisting of capacitor 32 and the parallel resistances 86 and 78, and the relay coil 76. This time constant is adjustable by adjustment of the variable resistor 86, to assure substantially complete deionization of the flashtube 50 before the relay 24 becomes deenergized, allowing contacts 22 thereof to again close to initiate the recharging of the capacitors 32 and 34 by connecting the transformer high voltage secondary 14 to the voltage doubling circuit 16. The Zener diode 82 in the relay coil holding circuit functions to reduce the amount of energy that normally would be required to be removed from the capacitor 32 in order to attain the relay drop-out point.

Thus, in the system shown in FIG. 1, disconnection of the capacitor bank from the charging current, and timing of such disconnection, is effected entirely by energy supplied from the capacitor bank, and no ancillary or auxiliary control capacitor circuit is required.

Reference will now be made to FIG. 2 of the drawings, which discloses a circuit embodying a somewhat different arrangement of components from that of FIG. 1, while nevertheless remaining basically the same in the use of the main capacitor means as a control element. The principal difference in the circuit of FIG. 2 is that a thyratron is employed as a means for discharging the triggering capacitor, and also as a means for energizing the coil of the control relay.

Power is provided through voltage regulating type transformer 10a having primary 12a and high voltage secondary 14a. The secondary 14a is connected to voltage doubling circuit 16a through conductor 18a at one side of the voltage doubling circuit, and through conductor 20a, normally closed contacts 22a of relay 24a and thence through conductor 26a at the other side of the voltage doubler 16a. The connection of conductor 26a with the voltage doubling circuit 16a is grounding. The voltage doubling circuit 16a includes diode rectifiers 28a and 30a and main capacitors 32a and 34a, and has respective positive and negative output terminals 36a and 38a.

The positive output terminal 36a of the voltage doubling circuit 16a is connected through conductor 46a to the anode 48a of flashtube 50a, while the cathode 52a of the flashtube is connected through conductor 54a to the negative voltage doubler terminal 38a.

Triggering transformer 56a has high voltage secondary 58a connected between ground and the ionizing electrode 60a of the flashtube. The primary 61a of the triggering transformer and the triggering capacitor 62a are connected across the anode-cathode circuit of thyratron 88 through a blocking diode 90. The blocking diode 90 allows discharge of triggering capacitor 62a through the thyratron 88 when the thyratron fires, but functions to force the charging current for triggering capacitor 62a to follow a path from the positive voltage doubler output terminal 36a through a series arrangement of a conductor 92, the coil 76a of control relay 24a, a resistor 94 and decoupling resistor 64a. Zener diode 82a is connected between the plate 95 of the thyratron and the connection between the two resistors 94 and 64a.

A voltage divider resistor 96 extends between the positive and negative terminals 36a and 38a, respectively, of the voltage doubling circuit 16a, the divider resistor 96 functioning to provide the correct voltages for the thyratron electrodes. The cathode 98 of the thyratron is grounded through ground conductor 100 which is connected to a tap 102 on the divider resistor 96, and which is also connected to one side of the trigger transformer primary 61a. The thyratron control grid 104 is negatively biased below cutoff through conductor 106 and resistor 108 to a biasing tap 110 on the voltage divider resistor 96.

Triggering switch 112, which is normally open, is connected between the ground conductor 100 and one side of a parallel arrangement of a capacitor 114 and a resistor 116, the other side of which is connected to the thyratron control grid 106. A bypass capacitor 118 is connected between the thyratron control grid 104 and ground, and serves to bypass any transient, spurious voltages that might otherwise raise the grid potential and inadvertently cause the thyratron to conduct.

The thyratron plate 95 is connected through a conductor 120 and normally open contacts 80a of the control relay 24a, and thence through conductor 26a to ground, for effectively removing the thyratron from the circuit upon energization of the control relay 24a, and to provide a holding circuit for the relay 24a.

Having described the circuit components and their arrangement in some detail, the operation of the circuit of FIG. 2 is as follows:

Assuming that charging of the main capacitors 32a and 34a is completed, the discharge of these main capacitors may be initiated by closure of the triggering switch 112. This causes the control grid 104 of the tyratron to momentarily be raised to cathode potential through capacitor 114, which is a sufficient grid potential relative to the cathode to cause the thyratron 88 to conduct. Two paths are provided for current conduction through the thyratron. First, a discharge path is provided for the trigger capacitor 62a, through the primary 61a of the trigger transformer 56a, which causes the trigger transformer seconday 58a to provide a high voltage pulse to ionizing electrode 60a so as to ionize the flashtube 50a and discharge the main capacitors 32a and 34a. The second path of current conduction through the thyratron is through conductor 92, control relay coil 76, resistor 94 and Zener diode 82a. Passage of current through this second path causes relay 24a to pick up, thereby opening relay contacts 22a to disconnect the input transformer secondary 14a from the voltage doubler 16a. This energization of relay 24a also closes relay contacts 84a so as to connect the discharge-timing variable resistor 86a across the main capacitor 32a. Energization of relay 24a further causes the contacts 80a to close, thereby grounding the thyratron plate 95, and establishing a holding circuit for relay 24a from positive output terminal 36a through conductor 92, relay coil 76a, resistor 94, Zener diode 82a, conductor 120, contacts 80a and conductor 26a to ground.

The control relay 24a is held in its energized condition by this holding circuit for a sufficient time interval to allow substantially complete deionization of the flashtube 50a. In the circuit of FIG. 2, the RC time constant determining this interval of time during which the relay 24a remains energized is determined principally by the RC circuit including variable resistor 86a and primary capacitor 32a. The combined resistance (in parallel with variable resistor 86a) of the control relay coil 76a and its series resistance 94 is large as compared to the resistance of variable resistor 86a, and is thereby of relatively little significance in the timing.

The Zener diode 82a functions substantially as described in connection with the circuit of FIG. 1, in that it reduces the amount of residual charge that would normally be required to be removed from the primary capacitor 32a to attain the control relay dropout point.

It is thus seen that the circuit of FIG. 2 differs primarily from that of FIG. 1 by employing a thyratron in place of the reed switch of FIG. 1. However, as with the circuit of FIG. 1, the circuit of FIG. 2 utilizes at least part of the main capacitor bank to provide energy and control for the timed disabling of the capacitor bank charging circuit until the flashtube has become substantially completely deionized.

FIG. 3 illustrates a voltage doubling circuit arrangement which may be employed in place of the simplified voltage doubling circuits 16 in FIG. 1 and 16a in FIG. 2, to provide variation in the amount of energy released to the load.

The voltage doubling circuit of FIG. 3 has a pair of input conductors 122 and 124 which are connected to a high voltage AC source, such as the input transformer secondary 14 of FIG. 1 or 14a of FIG. 2. The circuit of FIG. 3 has respective positive and negative output conductors 126 and 128 leading to the load terminals, as for example the respective positive and negative output terminals 36 and 38 of FIG. 1, or 36a and 38a of FIG. 2.

The input conductor 122 is connected between a pair of rectifier diodes 130 and 132, the other sides of which are connected, respectively, to positive terminal 134 and negative terminal 136. A first capacitor section 138 comprises capacitors 140 and 142 which are connected in series between the positive terminal 134 and negative terminal 136. A second capacitor section 144 comprises a series arrangement of capacitors 146 and 148. Similarly, a third capacitor section 150 comprises a series arrangement of capacitors 152 and 154. The second capacitor section 144 is connected between respective positive and negative terminals 156 and 158, while the capacitor section 150 is connected between respective positive and negative terminals 160 and 162. The input conductor 124 is electrically connected to each of the capacitor sections 138, 144 and 150 between the two capacitors of each of the three capacitor sections. Thus, the conductor 124 is connected between capacitors 140 and 142 in capacitor section 138; between capacitors 146 and 148 in capacitor section 144; and between capacitors 152 and 154 in capacitor section 150.

A diode 164 is connected between the positive terminals 134 and 156; while another diode 166 is connected between the negative terminals 136 and 158. Similarly, a diode 168 is connected between the positive terminals 134 and 160; while a diode 170 is connected between the negative terminals 136 and 162.

The circuit arrangement of FIG. 3 is arranged so that all three of the capacitor sections 138, 144 and 150 will be charged, but by appropriate switching, the amount of discharge energy may be varied. By means of such switching, either or both of the capacitor sections 144 and 150 may be removed from the discharge system. Disconnection or removal of the capacitor section 144 from the discharge system is accomplished by means of a double pole switch 172 which has contacts 174 disposed in an electrical connection from the positive terminal 156 to the positive output conductor 126. Similarly, the double pole switch 172 has contacts 176 in an electrical connection from negative terminal 158 to negative output conductor 128. Thus, switch 172 permits selective entry or removal of the second capacitor section 144 from the discharge system.

In a similar manner, double pole switch 178 permits the third capacitor section 150 to be selectively entered into or removed from the discharge circuit. Switch 178 includes contacts 180 interposed in a connection between positive terminal 160 and positive output conductor 126; and contacts 182 in a connection between negative terminal 162 and neagtive output conductor 128.

The circuit arrangement of FIG. 3 is completed by six additional blocking diodes 184, 186, 188, 190, 192 and 194. Diodes 184 and 186 are in the respective connections between positive and negative output terminals 134 and 136 and positive and negative output conductors 126 and 128. Similarly, diodes 188 and 190 are in the respective connections between positive and negative terminals 156 and 158 and positive and negative output conductors 126 and 128. In like manner, diodes 192 and 194 are in the respective connections between positive and negative terminals 160 and 162 and the positive and negative output conductors 126 and 128.

In the operation of the circuit of FIG. 3, the diodes 130 and 132 serve as the main rectifiers for converting the alternating current source provided through input conductors 122 and 124 to direct current for charging the three capacitor sections. Diodes 164 and 166 provide charging paths for the capacitors of section 144; while diodes 168 and 170 provide charging paths for the capacitors of section 150; the diodes 164, 166, 168 and 170 additionally functioning as blocking diodes to prevent current flow from a charged to a discharged capacitor section. The diodes 184, 186, 188, 190, 192 and 194 also function as blocking diodes to prevent flow from a charged to a discharged capacitor section.

In the operation of the system of FIG. 3, all three of the capacitor sections 138, 144 and 150 are brought up to charge simultaneously. Discharge may be effected by the means shown in either FIG. 1 or FIG. 2. Capacitor section 138 may be so discharged either singly or in parallel with either or both of the other two capacitor sections 144 and 150. Thus, if both of the switches 172 and 178 are open, then when discharge is effected the capacitor section 138 will be discharged singly. On the other hand, if both of the switches 172 and 178 are closed, all three of the capacitor sections 138, 144 and 150 will be simultaneously discharged. If, however, only one of the two switches 172 or 178 is closed, and the other is open, then the capacitor section 144 or 150 associated with the closed switch will be discharged simultaneously with the capacitor section 138.

In the event, for example, that capacitor section 138 only is discharged, then current feedback is prevented from the fully charged capacitors of sections 144 and 150 by the blocking diodes 164, 166, 168 and 170. Similarly, current flow from sections 144 and 150 into sections 138 is prevented by diodes 184 and 186 when either switch 172 or switch 178 is closed.

In the construction of a typical electronic flash lamp power supply, the capacitance of section 138 would be made equal to that of section 144, with their combined capacitance being equal to one-half of the total system capacitance. The capacitance of section 150 would then also have one-half of the system capacitance. Thus, if section 138 only is discharged, then 25% of the total system energy will flow into the load. This will occur with both of the switches 172 and 178 in their open positions.

Closure of switch 172 will result in simultaneous discharge of sections 138 and 144 in parallel, which will provide 50% of the system energy to the load. Closure of both of the switches 172 and 178 will result in simultaneous discharge of all three sections 138, 144 and 150, to provide 100% of the system energy to the load.

This arrangement of capacitor sections permits the selection of energy levels of 25%, 50% and 100% of full system rating for load discharge. These are the energy levels commonly used in photographic work, and they are referred to respectively as one-quarter power, one-half power and full power. It will be apparent, however that through the use of the switching means illustrated in FIG. 3 and described above, other energy level steps are readily attainable to suit any given application. If desired, a similar arrangement including additional capacitor sections may be provided to give a further selection of energy levels.

The energy level selecting arrangement of FIG. 3 completely avoids the use of current limiting resistances in series with the applicable capacitor sections, which was required in similar pair art devices. Thus, the circuit arrangement of FIG. 3 allows rapid capacitor recharging, while at the same time preventing current exchange between the charge and unchanged capacitor sections and thereby allowing very little, if any, switch contact erosion. The blocking diode arrangement in the circuit of FIG. 3 produces negligble energy loss in the system, so that the blocking diodes need not be switched out of the circuit prior to discharge, as were current limiting resistors previously employed. By this means, considerable circuit simplification is permitted as compared with circuits employing such current limiting resistors. The avoidance of such switching in the circuit of FIG. 3 also simplifies the problem for the operator, since he does not have to concern himself with the question of whether or not he switched these resistors out of the circuit prior to a flash discharge.

The following table lists circuit components and values thereof for test circuits which were established in accordance with FIGS. 1, 2 and 3, this table being given by way of example only and not by way of limitation.

| Component | Description |
| --- | --- |
| Transformers 10, 10a | General Electric voltage stabilizing type 120/345. |
| Transformers 56, 56a | United Transformer type PF–3 15000 v. |
| Diodes 28, 28a, 30, 30a, 130, 132 | Silicon diode, Syntron P/N S21100 1000 PIV. |
| Diode 90 | Silicon diode, Syntron P/N S1260 600 PIV. |
| Diodes 164, 166, 168, 170, 184, 186, 188, 190, 192, 194 | Silicon diode, Syntron P/N S2160 600 PIV. |
| Capacitors 32, 32a, 34, 34a, 140, 142, 146, 148, 152, 154 | Electrolytic, 500 mfd. 450 v. D.C. |
| Capacitors 62, 62a | Paper, 0.5 mfd. 600 v. |
| Capacitor 114 | Paper, 0.5 mfd. 200 v. |
| Capacitor 118 | Paper, 0.05 mfd. 200 v. |
| Resistors 64, 64a, 108, 116 | Fixed resistor 470,000 ohm. |
| Resistor 78 | Fixed resistor 1000 ohm. |
| Resistors 86, 86a | Variable resistor 750 ohm. |
| Resistor 94 | Fixed resistor 2500 ohm. |
| Resistor 96 | Adjustable tap resistor 100,000 ohm. |
| Relay 24 | 2PDT Union Switch & Signal Co. P/N 905 300 ohm coil. |
| Relay 24a | 2PDT Ohmite P/N DOSYX–68T 5000 ohm coil. |
| Reed switch 44 | Hamlin Inc. P/N DRT–5 with 3-turn current coil. |
| Switches 70, 112 | 1PST. |
| Switches 172, 178 | 2PST General Electric Series 135–B. |
| Thydratron 88 | RCA P/N 5727. |
| Zener diodes 82, 82a | Motorola 36 v., 10 watt. |
| Flashtubes 50, 50a | General Electric P/N FT 779. |

While the instant invention has been shown and described herein in what are conceived to be the most practical and preferred embodiments, it is recognized that departures may be made therefrom within the scope of the invention, which is therefore not to be limited to details disclosed herein.

I claim:

1. An electrical system which comprises a source of electrical power, capacitor means, charging circuit means for charging said capacitor means from said power source, a load, discharge circuit means for discharging said capacitor means into said load, disabling circuit means connected to said charging circuit means and to said capacitor means, said disabling circuit means being operable by electrical energy discharged from said capacitor means to temporarily disable said charging circuit, and resistor means coupled with at least a portion of said capacitor means in a capacitor discharge loop for discharging at least a portion of the residual charge remaining on said capacitor means after the capacitor means has discharged into the load, the RC time constant of said loop at least partially controlling the time interval required for the amount of electrical energy remaining on said capacitor means to fall below that required for operating said disabling circuit means and thereby at least partially controlling the time interval during which said charging circuit means is disabled by said disabling circuit means.

2. An electrical system as defined in claim 1, wherein said resistor means has a variable resistance value permitting adjustment of said RC time constant and consequent adjustment of the time interval during which said charging circuit is disabled by said disabling circuit means.

3. An electrical system which comprises a source of electrical power, capacitor means, charging circuit means for charging said capacitor means from said power source, a load, discharge circuit means for discharging said capacitor means into said load, and disabling circuit means connected to said charging circuit means and to said capacitor means, said disabling circuit means being operable by electrical energy discharged from said capacitor means to temporarily disable said charging circuit, said disabling circuit means including relay means energized by electrical energy discharged from said capacitor means.

4. An electrical system as defined in claim 3, wherein said disabling circuit means includes a relay energizing circuit portion providing a first current path between said capacitor means and said relay means for initially energizing said relay means substantially simultaneously with the disharge of said capacitor means into the load, and a relay holding circuit portion operable upon energization of said relay means to provide a second current path between said capacitor means and said relay means for holding said relay means in its energized condition until the amount of energy remaining on said capacitor means falls below a predetermined minimum value.

5. An electrical system as defined in claim 4, wherein said second current path has Zener diode means therein which reduces the amount of energy which must be discharged from said capacitor means for release of said holding circuit portion and consequent dropout of said relay means.

6. An electrical system as defined in claim 4, wherein said energizing circuit portion of said disabling circuit means includes a reed switch.

7. An electrical system as defined in claim 4, wherein said energizing circuit portion of said disabling circuit means includes a thyratron.

8. An electrical system as defined in claim 7, wherein said load is a flashtube, and triggering circuit means including said thyratron for triggering said flashtube.

9. An electrical system as defined in claim 4, which includes resistor means coupled with at least a portion of said capacitor means in a normally open capacitor discharge loop, said loop being connected to said relay means so as to be closed by said relay means upon energization of the latter for discharging at least a portion of the residual charge remaining on said capacitor means after the capacitor means has discharged into the load, the RC time constant of said loop at least partially controlling the time interval required for the amount of electrical energy remaining on said capacitor means to fall below that required for operating said disabling circuit means and thereby at least partially controlling the time interval during which said charging circuit means is disabled by said disabling circuit means.

10. An electrical system as defined in claim 9, wherein said resistor means has a variable resistance value permitting adjustment of said RC time constant and consequent adjustment of the time interval during which said charging current is disabled by said disabling circuit means.

11. An electrical system which comprises a source of electrical power, capacitor means, charging circuit means for charging said capacitor means from said power source, a load, discharge circuit means for discharging said capacitor means into said load, disabling circuit means connected to said charging circuit means and to said capacitor means, said disabling circuit means being operable by electrical energy discharged from said capacitor means to temporarily disable said charging circuit, said capacitor means comprising first and second capacitor sections, said charging circuit means being connected to said first section, for charging first section, charging path means from said first section to said second section for charging said second section, said charging path means having blocking diode means therein resisting discharge of said second section into said first section, first and second output connection means from the respective first and second sections to said discharge circuit means arranged for parallel discharge of the sections into said discharge circuit means, and switch means in said second output connection movable between a closed position wherein both sections may be simultaneously discharged into said discharge circuit means and an open position wherein said first section may be discharged without discharge of said second section.

12. A capacitor system as defined in claim 11, which includes further blocking diode means in said first output connection resisting discharge of said second section into said first section.

13. A capacitor system as defined in claim 11, which includes a third capacitor section, charging path means from said first section to said third section for charging said third section, said last mentioned charging path means having blocking diode means therein resisting discharge of said third section into said first section, third output connection means from said third section to said discharge circuit means arranged for parallel discharge of said third section with said first and second sections, and switch means in said third output connection movable between a closed position for discharge of said third section with said first section and an open position wherein said first section may be discharged without discharge of said third section.

14. A capacitor system comprising first and second capacitor sections, charging circuit means connected to said first section for charging said first section, charging path means from said first section to said second section for charging said second section, said charging path means having blocking diode means therein resisting discharge of said second section into said first section, discharge circuit means, first and second output connection means from the respective first and second sections to said discharge circuit means arranged for parallel discharge of the sections into said discharge circuit means, switch means in said second output connection moveable between a closed position wherein both sections may be simultaneously discharged into said discharge circuit means and an open position wherein said first section may be discharged without discharge of said second section.

15. A capacitor system as defined in claim 14, which includes further blocking diode means in said first output connection resisting discharge of said second section into said first section.

16. A capacitor system as defined in claim 14, which includes a third capacitor section, charging path means from said first section to said third section for charging said third section, said last mentioned charging path means having blocking diode means therein resisting discharge of said third section into said first section, third output connection means from said third section to said discharge circuit means arranged for parallel discharge of said third section with said first and second sections, and switch means in said third output connection movable between a closed position for discharge of said third section with said first section and an open position wherein said first section may be discharged without discharge of said third section.

17. A capacitor system as defined in claim 16, which includes further blocking diode means in each of said first, second and third output connections resisting discharge into each section from the other sections.

References Cited

UNITED STATES PATENTS

| | | | |
|---|---|---|---|
| 3,368,135 | 2/1968 | Schofield et al. | 320—1 |
| 3,375,403 | 3/1968 | Flieder | 315—241 X |

FOREIGN PATENTS 854,591   11/1960   Great Britain.

BERNARD KONICK, Primary Examiner

J. F. BREIMAYER, Assistant Examiner.

U.S. Cl. X.R.

307—110; 315—241; 317—151; 321—15